March 7, 1939.  J. T. McALISTER  2,149,783
TERRACE CHANNEL CHECKING DEVICE
Filed Feb. 11, 1938  2 Sheets-Sheet 1
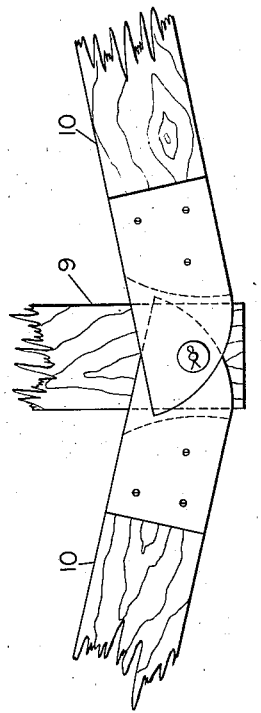
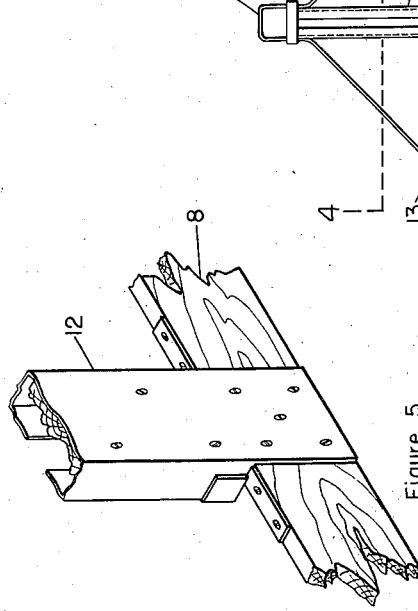
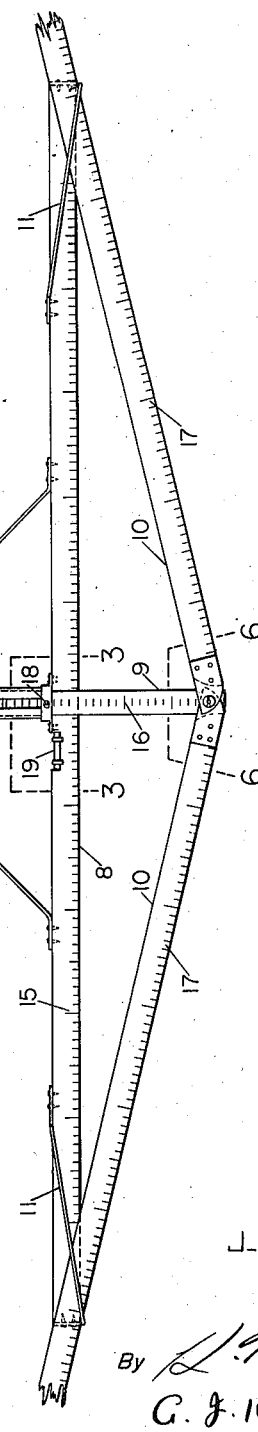
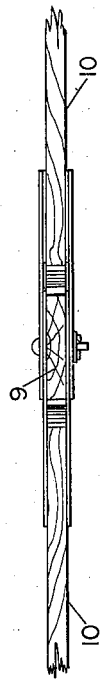
Inventor
J. T. McALISTER March 7, 1939.   J. T. McALISTER   2,149,783
TERRACE CHANNEL CHECKING DEVICE
Filed Feb. 11, 1938   2 Sheets-Sheet 2
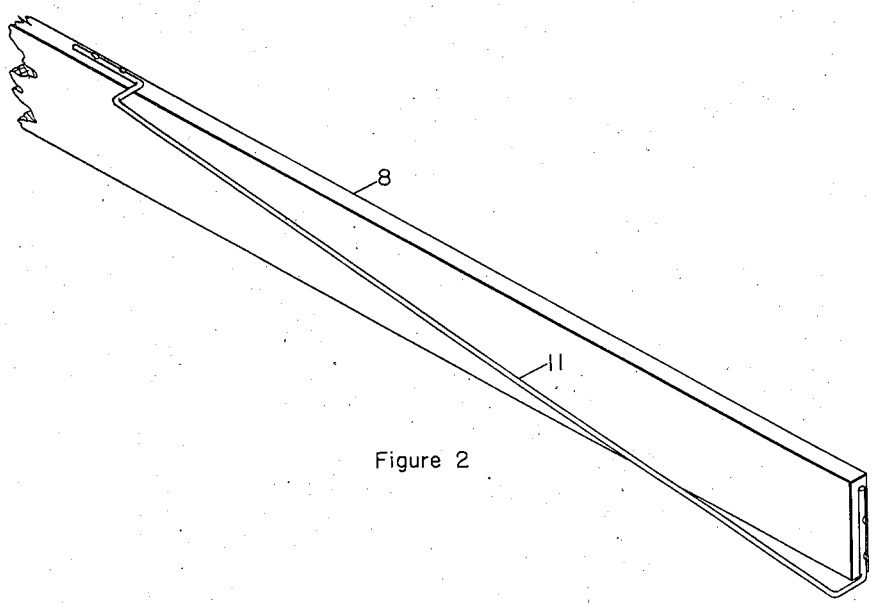
Figure 2
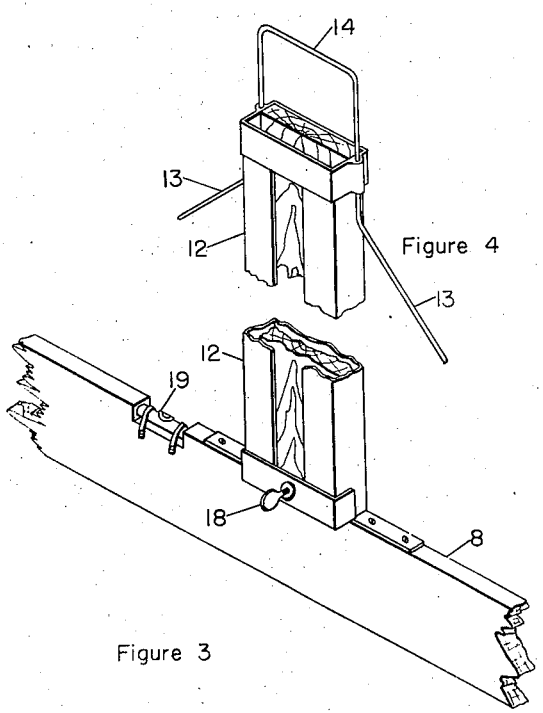
Figure 4
Figure 3
Inventor
J. T. McALISTER
By
   C. J. Kramer  Attorneys

Patented Mar. 7, 1939

2,149,783

UNITED STATES PATENT OFFICE

2,149,783

TERRACE CHANNEL CHECKING DEVICE

John Thomas McAlister, Spartansburg, S. C.; dedicated to the free use of the People of the United States of America Application February 11, 1938, Serial No. 189,962

4 Claims. (Cl. 33—93)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to me of any royalty thereon.

I hereby dedicate the invention herein described to the free use of the People of the United States of America to take effect on the granting of a patent to me.

This invention relates to a device for checking excavations of terrace channels and determining the slope of the banks thereof.

Terracing is one of the important practices now employed for erosion control. In terracing land, the slope is broken at intervals by constructing earth banks and drainage channels for collecting and conducting run-off water to a stabilized gradient. Such a procedure effects a division of a particular area into small watersheds, and it is necessary that the channels, called drain channels, have sufficient capacity to carry off the expected run-off. This capacity is determined by the cross-section and grade of the channels, and the principal object of this invention is to provide an instrument that can be used for quickly determining these cross-sections.

Another object of this invention is to provide such a device that is portable and that can be easily moved and set up for operation.

This invention is also applicable for measuring and quickly determining the height of ridges above the bottom of such channels. Since terraces with wide banks are frequently cultivated, this invention can further be used for quickly determining the slope of such banks.

The following description, considered together with the accompanying drawings, will disclose this invention more fully, its construction and operation of parts, and further objects and advantages thereof will be apparent.

In the drawings:

Figure 1 is a front elevational view of this invention in one of its forms.

Figure 2 is a fragmentary perspective view of the right end of the horizontal bar member, hereinafter designated by the numeral 8.

Figure 3 is a fragmentary perspective view of a portion of Figure 1 broken off along the line 3—3 with the vertical member 9 removed.

Figure 4 is a fragmentary perspective view of a portion of Figure 1 broken off along the line 4—4.

Figure 5 is a rear view of Figure 3.

Figure 6 is a fragmentary view of a portion of Figure 1 broken off along the line 6—6.

Figure 7 is a plan view of Figure 6.

Referring with more particularity to the drawings in which like numerals designate like parts, this device has the general shape of an inverted triangle consisting of a horizontal bar 8, a vertical strut 9 at the center of said horizontal bar, two angle members 10, 10 extending from the bottom of the strut 9 to the outer ends of the horizontal bar 8. These two angle members 10, 10 are hinged to the bottom of the strut 9 and are slidably carried on the ends of the horizontal bar 8 by means of rods 11, 11, each of said rods being diagonally disposed at the ends of said member 8, with sufficient space between the rods 11, 11 and the horizontal bar to permit the angle members 10, 10 to slide therebetween and to be supported by said rods, substantially as shown.

Directly over the vertical strut 9, a vertical member 12 is fixedly mounted on top of the horizontal bar 8 and carries a vertical box channel extending over the horizontal bar 8 within which the strut 9 slides. This vertical member 12 is braced by means of rods 13, 13, which may be formed of one piece, as shown, with the top part extending above the member 12 to form a handle 14 to provide convenience in handling the instrument.

The horizontal member 8 is provided with a graduated scale 15, the vertical member 9 with a graduated scale 16, and the angle members 10, 10 with graduated scales 17, 17.

A thumb set screw 18 is provided in the member 12 to clamp the vertical strut 9 in the box channel when setting prior to reading dimensions, and a line or string level 19 is placed on the horizontal member 8 for leveling the instrument.

Having thus described my invention, I claim:

1. A device for measuring excavations consisting of a graduated horizontal bar, two graduated angle members slidingly supported between said horizontal bar and rods carried on the ends thereof, a graduated vertical strut having said angle members hingedly secured to its lower end, and a vertical channel fixedly mounted on the top of said horizontal bar in which the upper portion of said vertical strut is slidably disposed.

2. A device for measuring excavations consisting of a graduated horizontal bar, two graduated angle members supported between said horizontal bar and rods carried on the ends thereof, a graduated vertical strut having said angle members hingedly secured to its lower end, a vertical channel fixedly mounted on the top of said horizontal bar in which the upper portion of said vertical strut is slidably disposed, and means for temporarily clamping said vertical strut in said channel.

3. A device for measuring excavations consisting of a graduated horizontal bar, two graduated angle members supported between said horizontal bar and rods carried on the ends thereof, a graduated vertical strut having said angle members hingedly secured to its lower end, a vertical channel fixedly mounted on the top of said horizontal bar in which the upper portion of said strut is slidably disposed, means for temporarily clamping said vertical strut in said channel, and means for accurately determining horizontal positions of said horizontal bar.

4. A device for measuring channel excavations comprising a graduated horizontal bar, a slotted vertical channel fixed on and overlapping said bar, means consisting of a bent rod for bracing said channel to said bar, said rod being bent to form a handle for the device at the top of said channel, a graduated vertical strut slidably disposed in said channel, means for selectively clamping said strut in said channel, two graduated diagonal bars co-hinged to the bottom end of said strut, and a bent rod secured to each end of said horizontal bar for slidably supporting said diagonal bars.

JOHN THOMAS McALISTER.